United States Patent
Tsuda et al.

(10) Patent No.: US 6,931,752 B2
(45) Date of Patent: Aug. 23, 2005

(54) MECHANISM FOR ALIGNING A WAVEGUIDE TYPE OPTICAL MEMBER AND FIBER ARRAYS

(75) Inventors: Naohiro Tsuda, Yokohama (JP); Hiromitsu Kobayashi, Yokohama (JP)

(73) Assignee: Moritex Corporation, Tokyo (JP)

( * ) Notice: Subject to any disclaimer, the term of this patent is extended or adjusted under 35 U.S.C. 154(b) by 0 days.

(21) Appl. No.: 10/382,541

(22) Filed: Mar. 7, 2003

(65) Prior Publication Data

US 2003/0230000 A1 Dec. 18, 2003

(30) Foreign Application Priority Data

Mar. 8, 2002 (JP) ........................................ 2002-063096

(51) Int. Cl.[7] .............................................. G01D 21/00
(52) U.S. Cl. ........................................... 33/645; 385/52
(58) Field of Search ......................... 33/645, 613, 503, 33/1 M; 385/52, 137, 16, 49, 45

(56) References Cited

U.S. PATENT DOCUMENTS

| | | | | |
|---|---|---|---|---|
| 4,600,282 A | * | 7/1986 | Yamamura et al. | ........... 33/645 |
| 5,708,741 A | * | 1/1998 | DeVeau | ....................... 385/49 |
| 6,181,856 B1 | * | 1/2001 | Brun | ............................ 385/52 |
| 6,585,524 B2 | * | 7/2003 | Robinson et al. | ........... 385/137 |
| 6,614,517 B1 | * | 9/2003 | Aubuchon et al. | ............ 385/16 |
| 6,681,496 B2 | * | 1/2004 | Law et al. | ..................... 33/645 |
| 2003/0086651 A1 | * | 5/2003 | Chang et al. | ................. 385/49 |

* cited by examiner

Primary Examiner—Christopher W. Fulton
Assistant Examiner—Travis Reis
(74) Attorney, Agent, or Firm—Townsend & Banta

(57) ABSTRACT

An aligning mechanism having stage mechanisms, each of which is composed of a first stage capable of moving in the direction in which a fiber array b advances to and retreats from a waveguide type optical member a, a holding section sustaining member 2 for the fiber array and a second stage 5 capable of moving in the direction perpendicular to the direction in which the fiber array spreads, wherein angle adjusting mechanisms 6 and 7 capable rotating around the rotation axis perpendicular to both the said directions are provided between the first and second stages and the holding section sustaining member and the second stage.

One aligning unit can be used for aligning either of two fiber arrays and a waveguide type optical member respectively having orthogonally ground end faces or either of fiber arrays and a waveguide type optical member respectively having obliquely ground end faces, and also allows the angle to be easily changed in response to the angle of the end faces.

5 Claims, 5 Drawing Sheets

MECHANISM FOR ALIGNING A WAVEGUIDE TYPE OPTICAL MEMBER AND FIBER ARRAYS

FIELD OF THE INVENTION

The present invention relates to an aligning mechanism used for assembling a waveguide type optical member and fiber arrays.

BACKGROUND OF THE INVENTION

Figure 7:
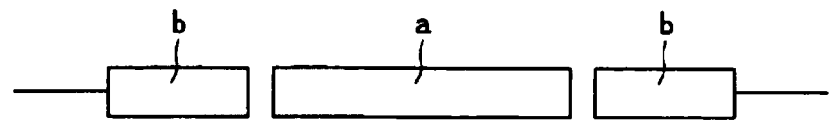
Figure 8:
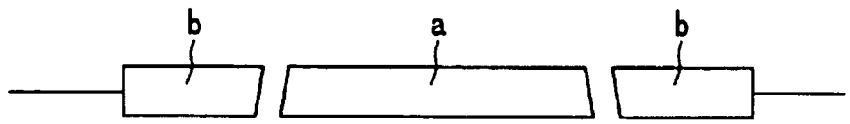

As shown in FIGS. 7 and 8, a waveguide type optical member a such as a waveguide or an AWG (arrayed waveguide grating) and fiber arrays b are aligned by means of an aligning mechanism, and immovably bonded for assembling.

In this case, the respective end faces as bonding faces are ground, for example, orthogonally as shown in FIG. 7, or obliquely as shown in FIG. 8. The obliquely ground end faces can have various angles, but presently those of 8 degrees are mainly used.

The conventional apparatus for aligning and immovably bonding a waveguide type optical member and fiber arrays is composed of a fixing base unit for holding the waveguide type optical member, and aligning units installed on both sides of it for holding and moving fiber arrays for alignment, and in general, each of the aligning units is composed of a six-axis stage mechanism of X, Y, Z, θx, θy and θz, where X denotes right-left direction; Y, vertical direction; Z, advancing and retreating direction (or longitudinal direction); θx, a rotating direction around X axis; θy, a rotating direction around Y axis; and θz, a rotating direction around Z axis.

For a waveguide type optical member and fiber arrays having orthogonally or obliquely ground end faces, the conventional aligning units designed for orthogonally ground end faces are used also for obliquely ground end faces, or special aligning units allowing the tilting of Y stage are used for obliquely ground end faces.

Figure 10:
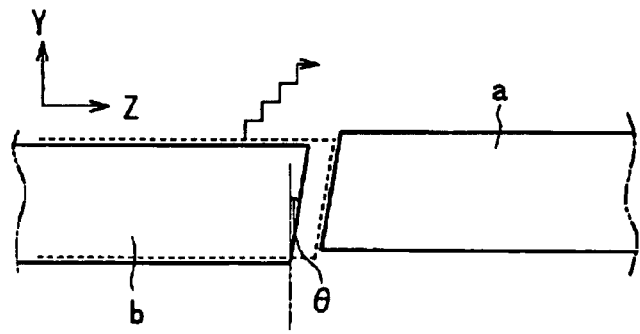

In the case where aligning units designed for orthogonally ground end faces are used for assembling the optical member and the fiber arrays respectively having obliquely ground end faces, when the fiber arrays b are moved along the oblique end faces of the waveguide type optical member a, a Z stage for longitudinal direction and a Y stage for vertical direction are used as shown in FIG. 10. That is, the Y stage is actuated to raise the fiber array b a little and subsequently the Z stage is actuated to let a fiber array b advance a little. These actions are repeated alternately to move the fiber array along a stairs-like locus.

On the other hand, in the case where a special aligning unit designed for obliquely ground end faces is used for assembling an optical member and either of two fiber arrays respectively having end faces of, for example, 8 degrees, a spacer worked to have an angle of 8 degrees is kept behind the Y stage, and the Y stage is fixed as tilted, while the fiber array is moved along the oblique end face of the waveguide type optical member.

In the case where an aligning unit designed for orthogonally ground end faces is used for aligning an optical member and either of two fiber arrays respectively having obliquely ground end faces, the two stages, i.e., the Y stage for vertical direction and the Z stage for longitudinal direction must be actuated alternately. So, it has the following problems: (a) it takes a long time for alignment, (b) if the moving distance of the Z stage is too long, the fiber array may be caused to collide with the waveguide type optical member, and (c) in the case where software is used for controlling those actions, it takes a time for adjustment.

On the other hand, in the case where a special aligning unit designed for obliquely ground end faces is used, it can be generally used only for a set angle, and even if it is attempted to use the aligning unit exchanging the spacer for a one having a different angle, adjustment is inconveniently necessary for achieving a desired accuracy. Furthermore, if an aligning unit is prepared for every angle, there arises a problem of high cost.

The object of this invention is to solve these problems.

SUMMARY OF THE INVENTION

To solve the above-mentioned problems, this invention proposes a mechanism for aligning a waveguide type optical member and fiber arrays, in which the fiber arrays are moved relatively to the waveguide type optical member held at a predetermined position for alignment by means of stage mechanisms, characterized in that each of the stage mechanisms is composed of a first stage capable of moving in a first direction corresponding to the direction in which the corresponding fiber array advances to and retreats from the waveguide type optical member, a holding section sustaining member for sustaining a holding section of the fiber array, and a second stage provided between the first stage and the holding section sustaining member and capable of moving in a second direction perpendicular to the direction in which the fiber array is spread, wherein first and second angle adjusting mechanisms capable of rotating with the third direction perpendicular to both the said first and second directions as the rotation axis are provided between the first stage and the second stage and between the holding section sustaining member and the second stage.

Furthermore, this invention proposes the above-mentioned constitution, wherein the rotation axis of the angle adjusting mechanism provided between the first stage and the second stage agrees with the rotation axis of the angle adjusting mechanism provided between the holding section sustaining member and the second stage.

Still furthermore, this invention proposes the above-mentioned constitution, wherein the second direction is vertical direction, and the third direction is right-left direction.

Still furthermore, this invention proposes the above-mentioned constitution, wherein each of the angle adjusting mechanisms is composed of a first member having a cylindrically concave face and a movable second member having a cylindrically convex face corresponding to the cylindrically concave face and abutting the cylindrically concave face, and a positioning and fixing means provided between the first and second members, for immovably fixing the first member and the second member at a predetermined angle.

Still furthermore, this invention proposes the above-mentioned constitution, wherein the positioning and fixing means is composed of a pin insertion hole formed in either the first member or the second member, plural selectable insertion holes formed in the other member, and a pin to be inserted into the pin insertion hole and any of the selectable insertion holes.

In the above-mentioned constitution, in the case where the aligning mechanism of this invention is used for assembling fiber arrays and a waveguide type optical member respectively having orthogonally ground end faces, the first angle adjusting mechanism is operated to fix the second stage with its moving direction kept perpendicular to the moving direction of the first stage, and the second angle adjusting mechanism is operated to fix the holding section sustaining member with its horizontally moving direction kept perpendicular to the moving direction of the second sage. In this case, the holding section sustaining member can be moved vertically in the direction along the end faces of the fiber arrays and the waveguide type optical member, and predetermined actions including these actions can achieve the alignment.

Furthermore, in the case where the alignment mechanism of this invention is used for assembling fiber arrays and a waveguide type optical member respectively having obliquely ground end faces, the first angle adjusting mechanism is operated to fix the second stage with its moving direction kept corresponding to the angle of the aforesaid end faces, that is, with its moving direction kept non-perpendicular to the moving direction of the first stage, and the second angle adjusting mechanism is operated to fix the holding section sustaining member with its horizontally moving direction kept in parallel to the moving direction of the first stage irrespective of the inclination of the second stage. In this case, if the second stage is actuated, the holding section sustaining member can be moved vertically in the direction along the oblique end faces of the fiber arrays and the waveguide type optical member, and predetermined actions including these actions can achieve the alignment.

In this case, if the rotation axis of the first angle adjusting mechanism provided between the first stage and the second stage is made to agree with the rotation axis of the second angle adjusting mechanism provided between the holding section sustaining member and the second stage, it is not necessary to change the positional relation of the holding section sustaining member and the second stage with the first stage when the first and second angle adjusting mechanisms are operated for angle adjustment. Therefore, when the aligning mechanism used for assembling fiber arrays and a waveguide type optical member respectively having orthogonally ground end faces is readjusted for assembling fiber arrays and a waveguide type optical member respectively having obliquely ground faces, or vice versa, the positions at which the holding section sustaining members hold the fiber arrays do not change, and the adjustment otherwise necessary for them is not necessary.

BREIF DESCRIPTION OF THE DRAWINGS

Figure 1:
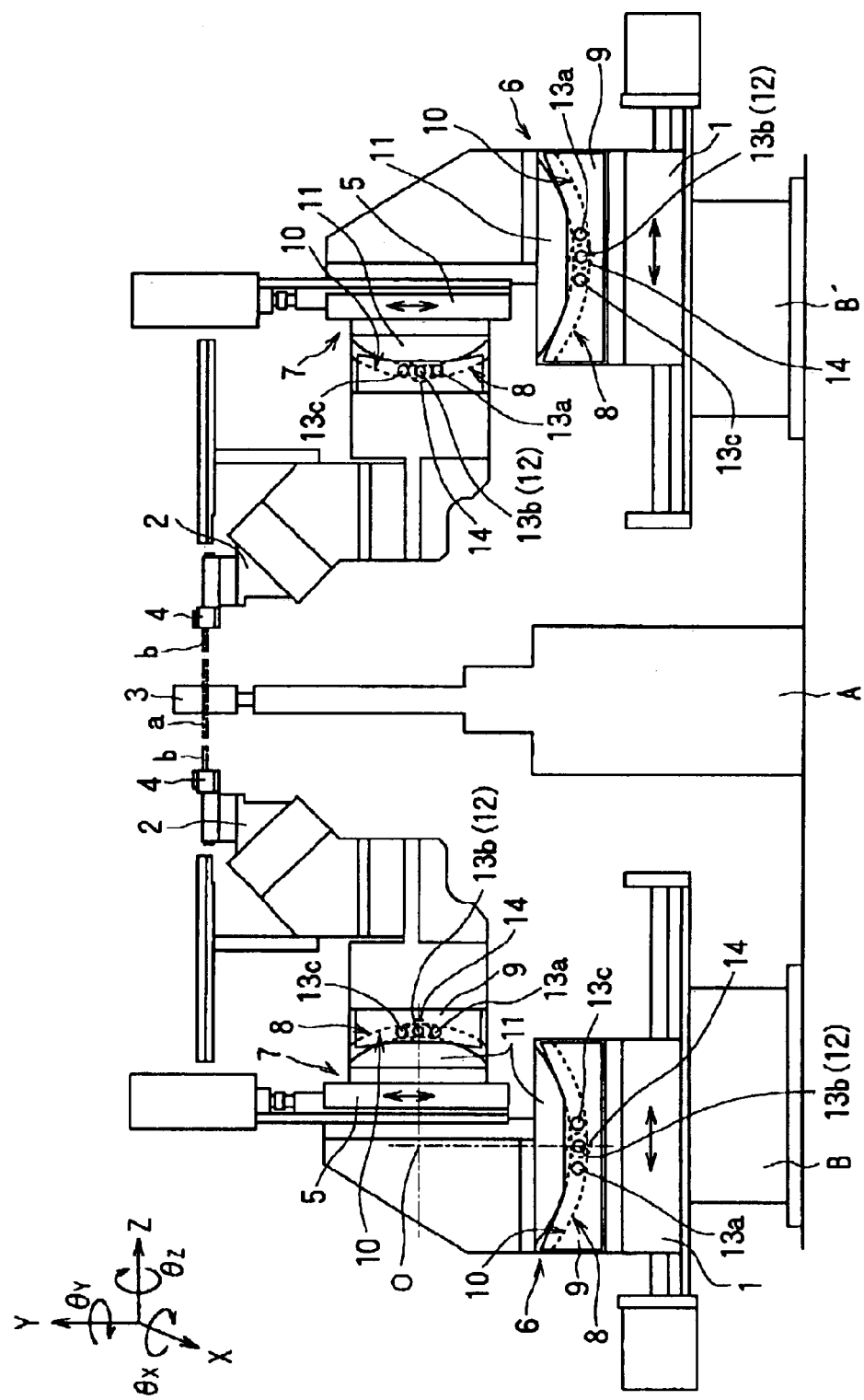
Figure 2:
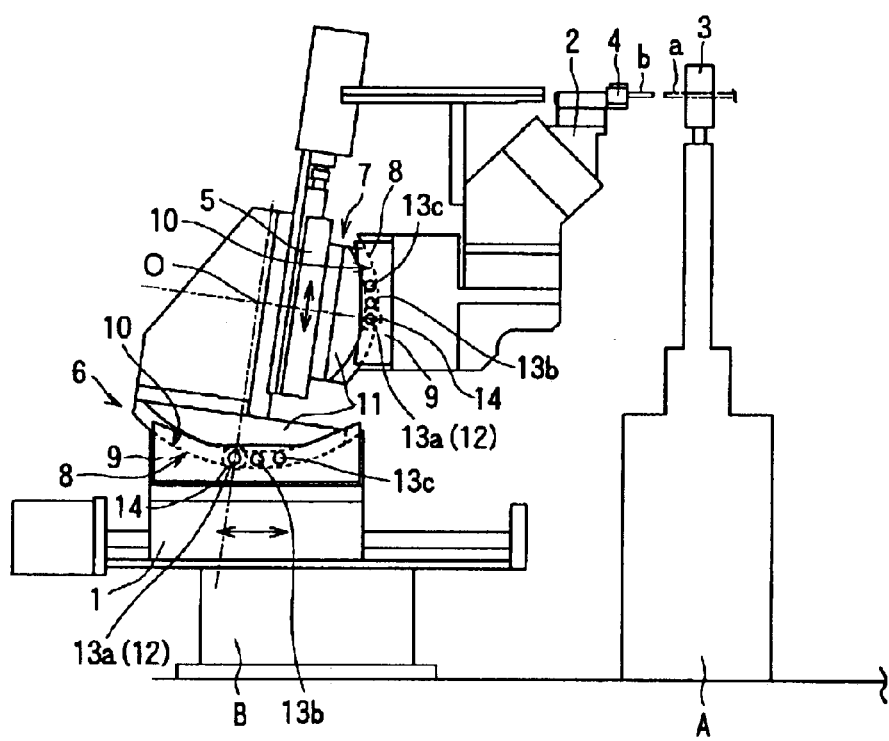
Figure 3:
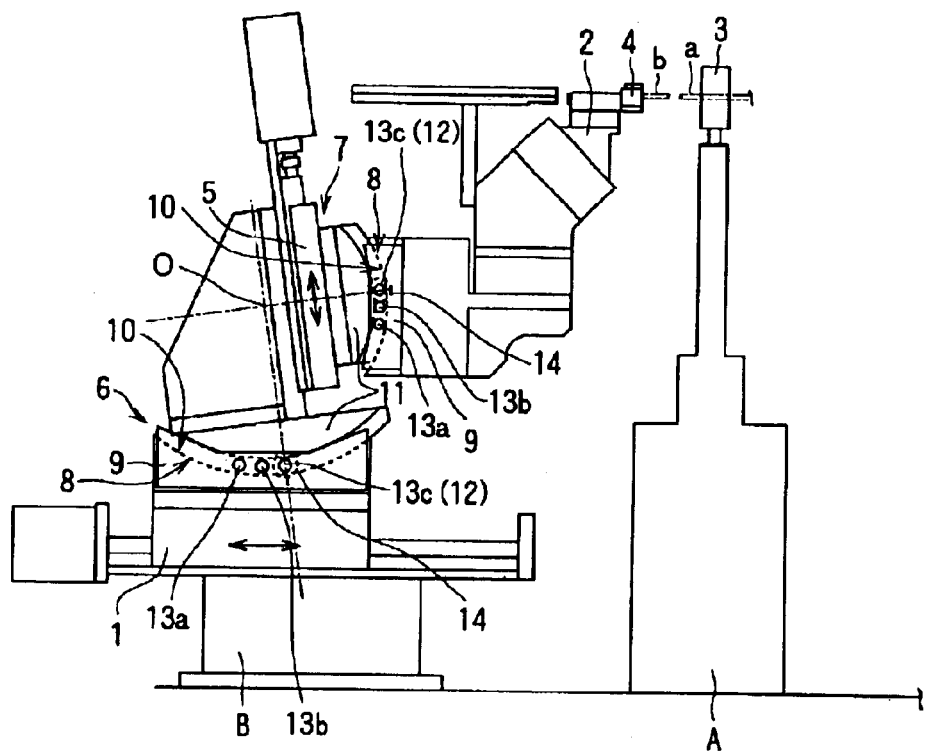
Figure 4:
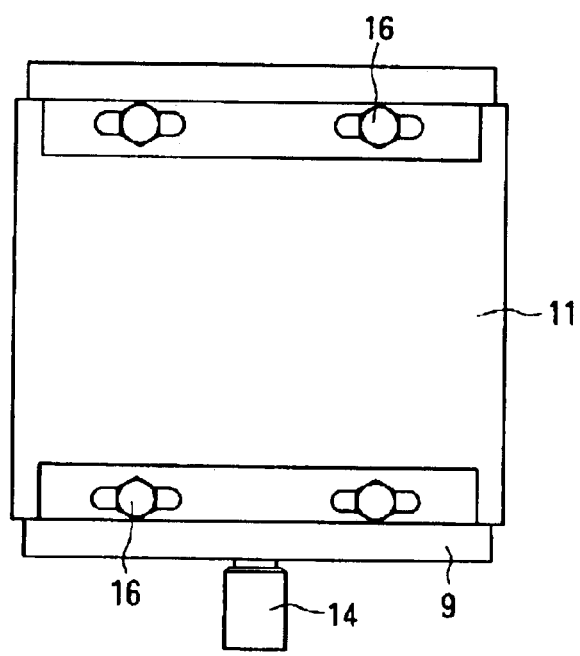
Figure 5:
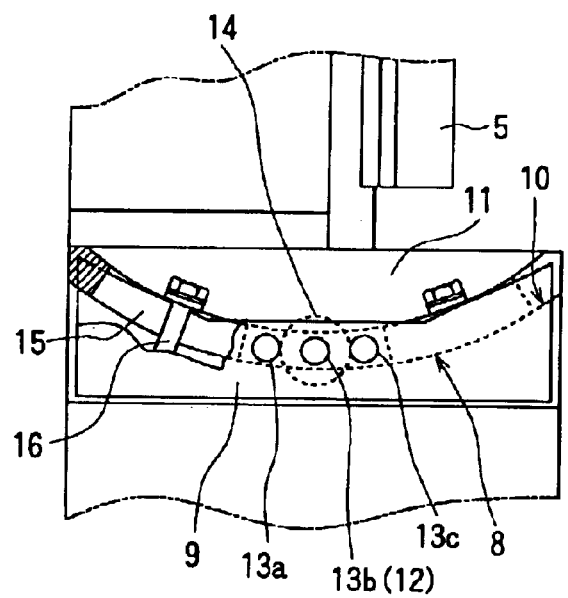
Figure 6:
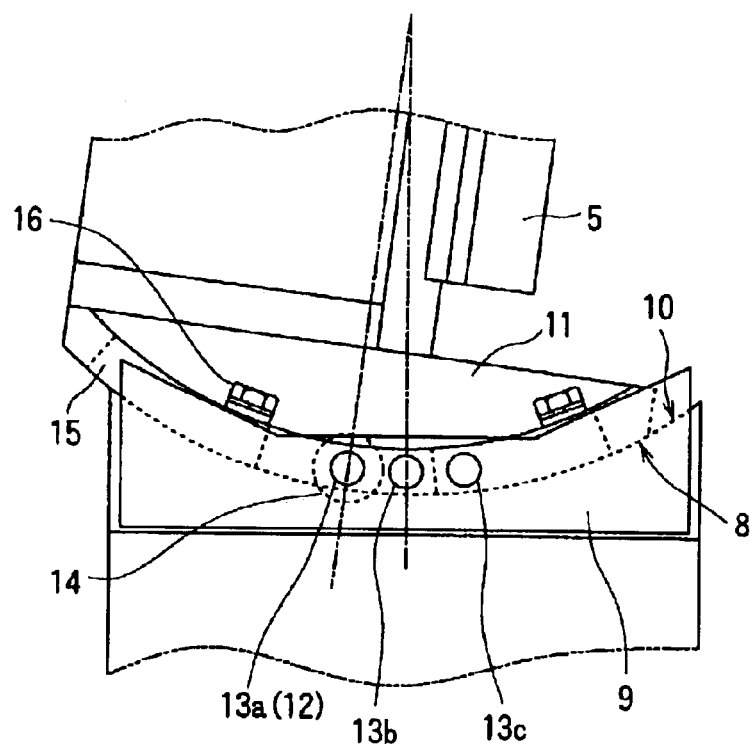
Figure 9:
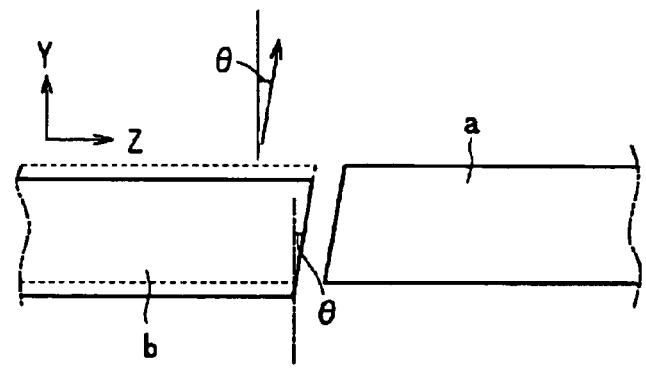

FIG. 1 is a schematic drawing showing the entire constitution of an apparatus containing the aligning mechanism of this invention, for assembling a waveguide type optical member and fiber arrays respectively having orthogonal end faces FIG. 2 is a schematic drawing showing an aligning unit containing the aligning mechanism of this invention, used for aligning a waveguide type optical member and fiber arrays having oblique end faces FIG. 3 is a schematic drawing showing an aligning unit containing the aligning mechanism of this invention, used for aligning fiber arrays and a waveguide type optical member respectively having end faces oblique in the reverse direction FIG. 4 is a plan view showing an example of an important portion of an angle adjusting mechanism FIG. 5 is a front view showing an important portion of the angle adjusting mechanism FIG. 6 is a front view showing an important portion of the angle adjusting mechanism, in which an angle has been adjusted FIG. 7 is an illustration showing a constitution of fiber arrays and a waveguide type optical member to be assembled FIG. 8 is an illustration showing another constitution of fiber arrays and a waveguide type optical member to be assembled FIG. 9 is an illustration showing an aligning action, in which this invention is applied FIG. 10 is an illustration showing a conventional aligning action.

DETAILED DESCRIPTION OF THE PREFERED EMBODIMENT

A preferred embodiment for carrying out this present invention are described below in reference to FIGS. 1 to 6 and 9.

FIG. 1 is a schematic drawing showing the entire constitution of an apparatus containing the aligning mechanism of this invention for assembling a waveguide type optical member and fiber arrays.

This assembling apparatus is composed of a fixing base unit A at the center and aligning units B and B' on both sides of it. The aligning unit B' is identical with the aligning unit B in constitution, except that they are installed in different directions. So, the corresponding elements are respectively given the same symbols to avoid double explanation.

On the fixing base unit A, a holding section 3 is provided for holding said waveguide type optical member a in a predetermined position.

Symbol 1 denotes a first stage capable of moving in a first direction corresponding to the direction in which the fiber array advances to and retreats from the waveguide type optical member a; 2, a holding section sustaining member for sustaining a holding section 4 of the fiber array b; and 5, a second stage provided between the first stage and the holding section sustaining member and capable of moving in a second direction perpendicular to the direction in which the fiber array 3 spreads. As shown in the rectangular coordinates in FIG. 1, the first direction is Z direction, and the second direction is Y direction. In the rectangular coordinates, the direction perpendicular to the Z and Y directions is X direction.

Though not shown in FIG. 1, in an actual apparatus, a stage capable of moving in X direction is provided between the first stage 1 and the second stage 5, and adequate stages such as swivel stages capable of rotating around the respective axes θx, θy and θz shown in the rectangular coordinates of FIG. 1 can be provided between the second stage 5 and the holding section sustaining member 2.

In this invention, in addition to the above-mentioned constitution, a first angle adjusting mechanism 6 and a second angle adjusting mechanism 7 respectively capable of rotating with the axis of third direction perpendicular to both the first and second directions, i.e., the axis of X direction of FIG. 1 as the rotation axis are provided between the first stage 1 and the second stage 5 and between the holding section sustaining member 2 and the second stage 5.

The particular constitution of the angle adjusting mechanisms 6 and 7 is described in reference to FIGS. 1 to 3, and also to FIGS. 4 to 6 showing the details of them. Each of the angle adjusting mechanisms 6 and 7 is composed of a first member 9 having a cylindrically concave face 8 and a movable second member 11 having a cylindrically convex face 10 corresponding to the cylindrically concave face 8 and abutting the cylindrically concave face 8, and a positioning and fixing means is provided between the first and second members for immovably fixing the first member and the second member at a predetermined angle.

The positioning and fixing means is composed of a pin insertion hole 12 formed in the second member 11, plural selectable insertion holes 13a, 13b and 13c formed in the first member 9 and a pin 14 to be inserted into the pin insertion hole 12 and any one of the selectable insertion holes 13a, 13b and 13c.

Furthermore, in the illustrated example, a slot 15 is formed in the second member 11, and a bolt 16 to be engaged with the slot 15 is provided in the first member 9, to define the relative movable range of the first member 9 and the secont member.

Moreover, in the illustrated example of the angle adjusting mechanism in FIGS. 5 and 6, the first member 9 is a member of the first stage 1, and the second member 11 is a member of the second stage 5. That is, the illustrated angle adjusting mechanism shows the first angle adjusting mechanism 6. However, this constitution of the angle adjusting mechanism can also be similarly applied to the second angle adjusting mechanism 7, i.e., the angle adjusting mechanism between the holding section sustaining member 2 and the second stage 5 as can be seen from the same symbols given in the drawings. In this embodiment, the centers of rotation of the first angle adjusting mechanism 6 and the second angle adjusting mechanism 7, i.e., the central axes O of the cylindrical faces corresponding to the cylindrically concave and convex faces of both the angle adjusting mechanisms 6 and 7 are identical.

In the above-mentioned constitution, in FIGS. 2 and 6, the second member 11 is turned clockwise in the drawings, and the pin 14 is inserted from the selectable insertion hole 13a into the pin insertion hole 12 of the second member 11 moved by the rotation, for fitting to ensure that the second member 11 is fixed at a predetermined angle in reference to the first member 9, in this case, at the position reached by rotating by an angle of 8 degrees mainly employed for oblique end faces as described before.

Furthermore, as shown in FIG. 3, if the second member 11 is rotated counterclockwise in the drawing, and the pin 14 is inserted from the selectable insertion hole 13c into the pin insertion hole 12 of the second member 11 moved by the rotation, then the second member 11 can be fixed at a predetermined angle in reference to the first member 9, in this case, at the position reached by rotating in the reverse direction by an angle of 8 degrees mainly employed for oblique end faces as described before.

In the above-mentioned constitution, in the case where the aligning mechanism of this invention is used for assembling fiber arrays b and a waveguide type optical member a respectively having orthogonally ground end faces, as shown in FIG. 7, the first angle adjusting mechanism 6 is operated to fix the second stage 5 with its moving direction kept perpendicular to the moving direction of the first stage 1, i.e., for projecting in the Y direction, and where the second angle adjusting mechanism 7 is operated for fixing the holding section sustaining member 2 with the axial direction of the fiber array b held by the holding section sustaining member 2 kept perpendicular to the Y direction as shown in FIG. 1, the holding section sustaining member 2 can be moved vertically in the direction along the end faces of the fiber array b and the waveguide type optical member a due to the action of the second stage 5 in Y direction. Thus, predetermined actions such as the actions in X direction and θx, θy and θz directions in the drawing including the above-mentioned actions can achieve the alignment.

Furthermore, in the case where the aligning mechanism of this invention is used to assemble fiber arrays b and a waveguide type optical member a respectively having obliquely ground end faces as shown in FIG. 8, the first angle adjusting mechanism 6 is operated to fix the second stage 5 with its moving direction kept corresponding to the angle of said end faces, for example, to an angle of 8 degrees, i.e., with its moving direction kept non-perpendicular to the moving direction of the first stage 1, and the second angle adjusting mechanism 7 is operated to fix the holding section sustaining member 2 with the axial direction of the fiber array b kept parallel to the moving direction of the first stage 1 irrespective of the inclination of the second stage 5, as explained for FIGS. 4 and 6. Thus, a fixed state as shown in FIGS. 2 and 6 can be achieved. Then, the second stage 5 is actuated as shown in FIG. 9, to allow the holding section sustaining member 2, hence the fiber array b to be moved in the direction along the oblique end face of the waveguide type optical member a. Predetermined actions including these actions can achieve the alignment.

In this embodiment, since the rotation axis of the first angle adjusting mechanism 6 agrees with the rotation axis of the second angle adjusting mechanism 7 at O, the positional relation of the second stage 5 and the holding section sustaining member 2 with the first stage 1 does not change when the first angle adjusting mechanism 6 and the second angle adjusting mechanism 7 are operated for said angle adjustment. Therefore, when the aligning mechanism used for assembling fiber arrays b and a waveguide type optical member a respectively having orthogonally ground end faces (the stage of FIG. 1) is readjusted for assembling fiber arrays and a waveguide type optical member respectively having obliquely ground end faces (the state of FIG. 2 or 3), or vice versa, the position at which the fiber array b is held by the holding section sustaining member 2 does not change, and the adjustment otherwise necessary for them is not necessary.

INDUSTRIAL APPLICABILITY

This invention as described above has the following features.

(a) One aligning unit can be used for aligning either of two fiber arrays and a waveguide type optical member respectively having orthogonally ground end faces or either of fiber arrays and a waveguide type optical member respectively having obliquely ground end faces, and also allows the angle to be easily changed in response to the angle of the end faces.

(b) In the use for the latter case, an erroneous operation that fiber arrays are caused to collide with a waveguide type optical member can be avoided, and furthermore the time taken for alignment can be shortened.

(c) Since a special aligning unit for those having obliquely ground end faces is not required, the cost can be reduced, and the installation space can also be reduced since there is no necessity of installing the special unit(s).

What is claimed is:

1. A mechanism for aligning a waveguide type optical member and fiber arrays, in which the fiber arrays are moved relatively to the waveguide type optical member held at a predetermined position for alignment by means of stage mechanisms, comprising:

a first stage capable of moving in a first direction (Z direction) corresponding to a direction in which the corresponding fiber array advances to and retreats from the waveguide type optical member, a holding section sustaining member for sustaining a holding section of the fiber array, a second stage provided between the first stage and the holding section sustaining member and capable of moving in a second direction (Y direction) perpendicular to the direction in which the fiber array is spread, a first angle adjusting mechanism provided between the first stage and the second stage, said first angle adjusting mechanism capable of rotating around a third direction (X direction), perpendicular to both the first direction (Z direction), and the second direction (Y direction) as the rotation axis, said first angle adjusting mechanisms having:
　a first member having a cylindrically concave face;
　a movable second member having a cylindrically convex face corresponding to the cylindrically concave face and abutting the cylindrically concave face, and
　a positioning and fixing means provided between the first and second members for immovably fixing the second member at a predetermined angle; and a second angle adjusting mechanism provided between the holding section sustaining member and the second stage, said second angle adjusting mechanism capable of rotating around the third direction (X direction), perpendicular to both the first direction (Z direction), and the second direction (Y direction), said second angle adjusting mechanism having:
　a first member having a cylindrically concave face;
　a movable second member having a cylindrically convex face corresponding to the cylindrically concave face and abutting the cylindrically concave face, and
　a positioning and fixing means provided between the first and second members for immovably fixing the second member at a predetermined angle.

2. The mechanism for aligning a waveguide type optical member and fiber arrays according to claim 1, wherein the rotation axis of the angle adjusting mechanism provided between the first stage and the second stage agrees with the rotation axis of the angle adjusting mechanism provided between the holding section sustaining member and the second stage.

3. The mechanism for aligning a waveguide type optical member and fiber arrays according to claim 1, wherein the second direction (Y direction) is vertical direction, and the third direction (X direction) is right-left direction.

4. The mechanism for aligning a waveguide type optical member and fiber arrays according to claim 1, wherein the positioning and fixing means of the first angle adjusting mechanism and the second angle adjusting mechanism comprises:
　a pin insertion hole formed in either the first member or the second member,
　plural selectable insertion holes formed in the member opposite the first member or second member having the pin insertion hole, and
　a pin to be inserted into the pin insertion hole and any of the selectable insertion holes.

5. The mechanism for aligning a waveguide type optical member and fiber arrays according to claim 4, further comprising:
　a slot formed in the cylindrically convex face of said second member;
　one or more bolt insertion holes formed in the cylindrically concave face of the first member adjacent the slot; and
　one or more bolts movably provided in said bolt insertions holes,
　wherein the bolts may be placed in said bolt insertion holes to define a movable range of the first member relative to the second member.

* * * * *